(12) United States Patent
Hagman et al.

(10) Patent No.: US 8,272,419 B2
(45) Date of Patent: Sep. 25, 2012

(54) GRAPHITE TAPE SUPPLY AND BACKING PAPER TAKE-UP APPARATUS

(75) Inventors: Thomas J. Hagman, Seattle, WA (US); Mark S. Bunker, Auburn, WA (US)

(73) Assignee: The Boeing Company, Chicago, IL (US)

( * ) Notice: Subject to any disclaimer, the term of this patent is extended or adjusted under 35 U.S.C. 154(b) by 32 days.

(21) Appl. No.: 13/012,617

(22) Filed: Jan. 24, 2011

(65) Prior Publication Data

US 2011/0114265 A1 May 19, 2011

Related U.S. Application Data

(62) Division of application No. 11/968,542, filed on Jan. 2, 2008, now Pat. No. 7,922,856.

(51) Int. Cl.
*B29C 65/50* (2006.01)
*B32B 37/00* (2006.01)
*B32B 38/00* (2006.01)
*B32B 43/00* (2006.01)
*B65H 23/00* (2006.01)
*B65H 59/00* (2006.01)
*B65H 59/16* (2006.01)

(52) U.S. Cl. ........ 156/494; 156/361; 156/537; 156/538; 242/410; 242/419.9

(58) Field of Classification Search .................. 156/166, 156/169, 174, 184, 247–250, 267, 268, 289, 156/701, 361, 362, 391, 425, 426, 494, 510, 156/522, 525, 526, 537, 538; 242/410, 412, 242/416, 419.9

See application file for complete search history.

(56) References Cited

U.S. PATENT DOCUMENTS

| 799,374 | A | 9/1905 | Gray et al. |
|---|---|---|---|
| 920,776 | A | 5/1909 | Pohl |
| 1,132,837 | A | 3/1915 | Eggleston |
| 1,195,554 | A | 8/1916 | Bourdin |
| 1,370,339 | A | 3/1921 | Midgley |
| 1,420,271 | A | 6/1922 | Mclane |
| 1,464,632 | A | 8/1923 | Wayne |

(Continued)

FOREIGN PATENT DOCUMENTS

DE 2505223 8/1976

(Continued)

OTHER PUBLICATIONS

USPTO Office Action for U.S. Appl. No. 11/968,542 dated Aug. 19, 2010.

(Continued)

*Primary Examiner* — Sing P Chan
(74) *Attorney, Agent, or Firm* — Yee & Associates, P.C.

(57) ABSTRACT

An apparatus for supplying one or more strands of a relatively wide tape to a high-speed graphite tape laminating machine may include a tape supply reel and a backing paper take-up reel rotatably mounted on the machine, a dancer roller mounted on the machine for lateral movement thereon, and a mechanism for actively controlling the rotation of the tape supply and backing paper take-up reels and the lateral movement of the dancer roller relative to the support frame such that the respective tensions in the tapes are maintained substantially constant during both an on-the-fly tape add operation and an on-the-fly tape cut operation of the laminating machine.

15 Claims, 9 Drawing Sheets

U.S. PATENT DOCUMENTS

| | | | | |
|---|---|---|---|---|
| 1,512,096 | A | 10/1924 | Hopkinson | |
| 1,930,733 | A | 10/1933 | Tomlin | |
| 2,182,358 | A | 12/1939 | Sherts et al. | |
| 2,220,760 | A | 11/1940 | Gates et al. | |
| 2,345,541 | A | 3/1944 | Scholze, Jr. | |
| 2,722,590 | A | 11/1955 | Engler | |
| 2,871,716 | A | 2/1959 | Stade | |
| 3,037,898 | A | 6/1962 | Zumofen | |
| 3,137,452 | A | 6/1964 | Winders | |
| 3,329,181 | A | 7/1967 | Buss et al. | |
| 3,574,040 | A | 4/1971 | Chitwood et al. | |
| 3,602,416 | A | 8/1971 | Basche et al. | |
| 3,684,278 | A | 8/1972 | Takahaski | |
| 3,695,977 | A | 10/1972 | Kandelaki et al. | |
| 3,775,219 | A * | 11/1973 | Karlson et al. | 156/363 |
| 3,810,805 | A * | 5/1974 | Goldsworthy et al. | 156/361 |
| 3,844,822 | A * | 10/1974 | Boss et al. | 427/377 |
| 3,910,522 | A | 10/1975 | Lee et al. | |
| 3,970,831 | A * | 7/1976 | Hegyi | 318/568.1 |
| 3,992,240 | A | 11/1976 | Kuehn, Jr. | |
| 4,091,979 | A * | 5/1978 | Browder | 242/615 |
| 4,100,004 | A | 7/1978 | Moss et al. | |
| 4,133,711 | A | 1/1979 | August et al. | |
| 4,135,447 | A * | 1/1979 | Barnes et al. | 101/177 |
| 4,186,861 | A | 2/1980 | Steinhilber | |
| 4,208,238 | A | 6/1980 | August et al. | |
| 4,234,374 | A * | 11/1980 | Frank | 156/459 |
| 4,241,884 | A | 12/1980 | Lynch | |
| 4,259,144 | A * | 3/1981 | Ballentine | 156/522 |
| 4,267,951 | A * | 5/1981 | Grant et al. | 242/615.4 |
| 4,285,752 | A * | 8/1981 | Higgins | 156/250 |
| 4,292,108 | A * | 9/1981 | Weiss et al. | 156/259 |
| 4,328,061 | A * | 5/1982 | Off et al. | 156/353 |
| 4,351,688 | A * | 9/1982 | Weiss et al. | 156/358 |
| 4,382,836 | A * | 5/1983 | Frank | 156/459 |
| 4,419,170 | A | 12/1983 | Blad | |
| 4,432,828 | A | 2/1984 | Siempelkamp et al. | |
| 4,461,669 | A | 7/1984 | Dontscheff | |
| 4,462,551 | A | 7/1984 | Bloch | |
| 4,491,493 | A | 1/1985 | Eaton | |
| 4,506,969 | A | 3/1985 | Baker | |
| 4,508,584 | A * | 4/1985 | Charles | 156/353 |
| 4,531,992 | A * | 7/1985 | Eaton | 156/152 |
| 4,541,886 | A | 9/1985 | Marlow et al. | |
| 4,557,783 | A * | 12/1985 | Grone et al. | 156/257 |
| 4,557,790 | A * | 12/1985 | Wisbey | 156/511 |
| 4,560,433 | A * | 12/1985 | Frank | 156/459 |
| 4,569,716 | A | 2/1986 | Pugh | |
| 4,574,029 | A * | 3/1986 | Murray | 156/500 |
| 4,588,466 | A * | 5/1986 | Eaton | 156/235 |
| 4,591,402 | A * | 5/1986 | Evans et al. | 156/350 |
| 4,627,886 | A * | 12/1986 | Grone et al. | 156/361 |
| 4,636,276 | A * | 1/1987 | Nozaka | 156/353 |
| 4,680,806 | A | 7/1987 | Bolza-Schunemann | |
| 4,696,707 | A * | 9/1987 | Lewis et al. | 156/64 |
| 4,699,683 | A | 10/1987 | McCowin | |
| 4,706,442 | A | 11/1987 | Riemenschneider | |
| 4,707,212 | A * | 11/1987 | Hailey et al. | 156/361 |
| 4,750,965 | A * | 6/1988 | Pippel et al. | 156/361 |
| 4,781,782 | A * | 11/1988 | Luhman et al. | 156/361 |
| 4,799,981 | A * | 1/1989 | Stone et al. | 156/64 |
| 4,842,215 | A | 6/1989 | Takami | |
| 4,867,834 | A | 9/1989 | Alenskis et al. | |
| 4,877,471 | A | 10/1989 | McCowin et al. | |
| 4,878,984 | A | 11/1989 | Bourrieres | |
| 4,880,488 | A | 11/1989 | Matsuo et al. | |
| 4,909,880 | A * | 3/1990 | Kittelson et al. | 156/189 |
| 4,938,824 | A | 7/1990 | Youngkeit | |
| 4,943,338 | A | 7/1990 | Wisbey | |
| 4,978,417 | A | 12/1990 | Grimshaw et al. | |
| 4,990,213 | A | 2/1991 | Brown et al. | |
| 5,000,397 | A | 3/1991 | Darrieux | |
| 5,041,179 | A * | 8/1991 | Shinno et al. | 156/64 |
| 5,045,147 | A | 9/1991 | Benson et al. | |
| 5,100,493 | A | 3/1992 | Leclere et al. | |
| 5,110,395 | A | 5/1992 | Vaniglia | |
| 5,114,519 | A | 5/1992 | Grimshaw et al. | |
| 5,120,976 | A | 6/1992 | Clayton et al. | |
| 5,148,572 | A | 9/1992 | Wells et al. | |
| 5,197,198 | A | 3/1993 | Onozato | |
| 5,200,018 | A * | 4/1993 | Gill et al. | 156/359 |
| 5,213,646 | A | 5/1993 | Zsolnay et al. | |
| 5,249,120 | A | 9/1993 | Foley | |
| 5,290,386 | A | 3/1994 | Trudeau | |
| 5,290,389 | A | 3/1994 | Shupe et al. | |
| 5,294,803 | A | 3/1994 | Pahr | |
| 5,345,399 | A | 9/1994 | Collins | |
| 5,397,415 | A * | 3/1995 | Manabe et al. | 156/234 |
| 5,431,749 | A * | 7/1995 | Messner | 156/358 |
| 5,448,505 | A | 9/1995 | Novak | |
| 5,480,508 | A | 1/1996 | Manabe et al. | |
| 5,482,589 | A | 1/1996 | Shin et al. | |
| 5,560,942 | A | 10/1996 | Curry | |
| 5,562,788 | A | 10/1996 | Kitson et al. | |
| 5,627,647 | A | 5/1997 | Baan et al. | |
| 5,645,677 | A | 7/1997 | Cahuzac et al. | |
| 5,659,229 | A | 8/1997 | Rajala | |
| 5,698,066 | A | 12/1997 | Johnson et al. | |
| 5,700,347 | A | 12/1997 | McCowin | |
| 5,725,175 | A | 3/1998 | Thundathil | |
| 5,879,505 | A | 3/1999 | Fujisawa et al. | |
| 5,954,917 | A | 9/1999 | Jackson et al. | |
| 6,041,840 | A | 3/2000 | Ogawa | |
| 6,073,670 | A | 6/2000 | Koury | |
| 6,096,164 | A | 8/2000 | Benson et al. | |
| 6,100,986 | A | 8/2000 | Rydningen | |
| 6,112,792 | A * | 9/2000 | Barr et al. | 156/441 |
| 6,164,477 | A | 12/2000 | Druckman et al. | |
| 6,215,553 | B1 | 4/2001 | Rider et al. | |
| 6,240,333 | B1 | 5/2001 | McGee | |
| 6,262,814 | B1 | 7/2001 | Furukawa | |
| 6,312,247 | B1 | 11/2001 | Kassuelke et al. | |
| 6,315,235 | B1 | 11/2001 | Breyer et al. | |
| 6,325,568 | B1 | 12/2001 | Druckman et al. | |
| 6,391,436 | B1 | 5/2002 | Xu et al. | |
| 6,436,528 | B1 * | 8/2002 | Kulper et al. | 428/343 |
| 6,441,905 | B1 | 8/2002 | Tojyo et al. | |
| 6,451,152 | B1 | 9/2002 | Holmes et al. | |
| 6,459,494 | B1 | 10/2002 | Kurokawa et al. | |
| 6,474,389 | B1 | 11/2002 | Steelman et al. | |
| 6,520,234 | B1 | 2/2003 | Anderson et al. | |
| 6,544,367 | B1 | 4/2003 | Fujimoto et al. | |
| 6,638,388 | B2 * | 10/2003 | Nagata et al. | 156/230 |
| 6,675,688 | B2 | 1/2004 | Ostini | |
| 6,706,131 | B2 | 3/2004 | Steelman et al. | |
| 6,748,836 | B2 | 6/2004 | Vivirito et al. | |
| 6,752,190 | B1 * | 6/2004 | Boll et al. | 156/433 |
| 6,764,754 | B1 | 7/2004 | Hunter et al. | |
| 6,767,426 | B1 | 7/2004 | Yamamoto | |
| 6,773,537 | B2 * | 8/2004 | Erickson et al. | 156/250 |
| 6,799,081 | B1 | 9/2004 | Hale et al. | |
| 6,799,619 | B2 | 10/2004 | Holmes et al. | |
| 6,823,342 | B2 | 11/2004 | Wallen et al. | |
| 6,860,957 | B2 | 3/2005 | Sana et al. | |
| 6,900,547 | B2 | 5/2005 | Polk, Jr. et al. | |
| 6,966,966 | B2 | 11/2005 | Koizumi et al. | |
| 6,968,971 | B2 | 11/2005 | Ely | |
| 6,979,501 | B2 | 12/2005 | Merton | |
| 6,984,429 | B2 * | 1/2006 | Thunhorst et al. | 428/41.8 |
| 7,010,544 | B2 | 3/2006 | Wallen et al. | |
| 7,048,024 | B2 | 5/2006 | Clark et al. | |
| 7,063,118 | B2 | 6/2006 | Hauber et al. | |
| 7,137,182 | B2 | 11/2006 | Nelson | |
| 7,206,665 | B2 * | 4/2007 | Groppe | 700/245 |
| 7,213,629 | B2 | 5/2007 | Ledet et al. | |
| 7,282,107 | B2 | 10/2007 | Johnson et al. | |
| 7,293,590 | B2 * | 11/2007 | Martin | 156/361 |
| 7,326,312 | B1 * | 2/2008 | Rust et al. | 156/234 |
| 7,337,818 | B2 * | 3/2008 | Briese et al. | 156/356 |
| 7,341,086 | B2 | 3/2008 | Nelson et al. | |
| 7,376,480 | B2 | 5/2008 | Hagen et al. | |
| 7,407,556 | B2 | 8/2008 | Oldani et al. | |
| 7,419,031 | B2 | 9/2008 | Liguore et al. | |
| 7,455,740 | B2 * | 11/2008 | Bostanjoglo et al. | 148/525 |
| 7,455,742 | B2 | 11/2008 | Ledet et al. | |
| 7,472,736 | B2 | 1/2009 | Kisch et al. | |
| 7,478,780 | B2 | 1/2009 | Wilding et al. | |

| | | | | | | |
|---|---|---|---|---|---|---|
| 7,517,426 | B2 | 4/2009 | Mano et al. | EP | 2228200 | 9/2010 |
| 7,527,084 | B2 | 5/2009 | Kaczkowski | EP | 2228333 | 9/2010 |
| 7,536,242 | B2 | 5/2009 | Ledet et al. | ES | 2253005 | 5/2006 |
| 7,591,294 | B2 * | 9/2009 | Wampler et al. ............... 156/523 | GB | 2065566 | 7/1981 |
| 7,643,970 | B2 | 1/2010 | Drumheller et al. | JP | 05126536 | 5/1993 |
| 7,681,615 | B2 | 3/2010 | McCowin | JP | 07182724 | 7/1995 |
| 7,717,151 | B2 * | 5/2010 | Wampler et al. ............... 156/523 | JP | 08327330 | 12/1996 |
| 7,747,421 | B2 | 6/2010 | Tang et al. | JP | 09210665 | 8/1997 |
| 7,748,425 | B2 | 7/2010 | Tingley | JP | 2006347121 | 12/2006 |
| 7,766,063 | B2 * | 8/2010 | Lauder et al. ................. 156/355 | SU | 1019227 | 5/1983 |
| 7,769,481 | B2 | 8/2010 | Tang et al. | WO | WO0196223 | 12/2001 |
| 7,809,454 | B2 | 10/2010 | Hu et al. | WO | WO03035380 | 5/2003 |
| 7,824,512 | B2 | 11/2010 | Lauder et al. | WO | WO2005030458 | 4/2005 |
| 7,842,145 | B2 | 11/2010 | Hogg | WO | WO2005105641 | 11/2005 |
| 7,849,903 | B2 | 12/2010 | Vaniglia | WO | WO2006021601 | 3/2006 |
| 7,867,352 | B2 | 1/2011 | Johnson et al. | WO | WO2006060270 | 6/2006 |
| 7,922,856 | B2 | 4/2011 | Hagman et al. | WO | 2006101379 A2 | 9/2006 |
| 8,029,642 | B2 | 10/2011 | Hagman | WO | WO2006118692 | 11/2006 |
| 8,147,637 | B2 | 4/2012 | Kisch et al. | WO | WO2009038895 | 3/2009 |
| 8,156,988 | B2 | 4/2012 | Martinez | WO | WO2009038943 | 3/2009 |
| 2003/0015298 | A1 | 1/2003 | Steelman et al. | WO | WO2009108517 | 9/2009 |
| 2003/0102070 | A1 | 6/2003 | Black et al. | WO | WO2010005996 | 1/2010 |
| 2003/0145932 | A1 | 8/2003 | Holmes et al. | | | |
| 2004/0026025 | A1 | 2/2004 | Sana et al. | | | |
| 2004/0112534 | A1 | 6/2004 | Koizumi et al. | | | |
| 2004/0226651 | A1 | 11/2004 | Ledet et al. | | | |
| 2005/0016671 | A1 | 1/2005 | Sharp | | | |
| 2005/0039842 | A1 | 2/2005 | Clark et al. | | | |
| 2005/0039843 | A1 | 2/2005 | Johnson et al. | | | |
| 2005/0194210 | A1 | 9/2005 | Panossian | | | |
| 2005/0227124 | A1 | 10/2005 | Merton | | | |
| 2005/0247396 | A1 | 11/2005 | Oldani et al. | | | |
| 2006/0073309 | A1 | 4/2006 | Hogg | | | |
| 2006/0090856 | A1 | 5/2006 | Nelson et al. | | | |
| 2006/0106507 | A1 | 5/2006 | Ledet et al. | | | |
| 2006/0118244 | A1 | 6/2006 | Zaballos et al. | | | |
| 2006/0147669 | A1 | 7/2006 | Mano et al. | | | |
| 2006/0162143 | A1 | 7/2006 | Nelson et al. | | | |
| 2006/0180270 | A1 | 8/2006 | Ledet et al. | | | |
| 2006/0226651 | A1 | 10/2006 | Griswold et al. | | | |
| 2006/0260751 | A1 | 11/2006 | Lauder et al. | | | |
| 2007/0029030 | A1 | 2/2007 | McCowin | | | |
| 2007/0034340 | A1 | 2/2007 | Kaczkowski | | | |
| 2007/0039434 | A1 | 2/2007 | DeVlieg et al. | | | |
| 2007/0044896 | A1 | 3/2007 | Tingley | | | |
| 2007/0044900 | A1 | 3/2007 | Tingley | | | |
| 2007/0069080 | A1 | 3/2007 | Rassaian et al. | | | |
| 2007/0102239 | A1 | 5/2007 | Liguore et al. | | | |
| 2007/0106407 | A1 | 5/2007 | Drumheller et al. | | | |
| 2007/0106418 | A1 | 5/2007 | Hagen et al. | | | |
| 2007/0144676 | A1 | 6/2007 | Tang et al. | | | |
| 2007/0150087 | A1 | 6/2007 | Tang et al. | | | |
| 2007/0187024 | A1 | 8/2007 | Johnson et al. | | | |
| 2007/0234907 | A1 | 10/2007 | Martinez | | | |
| 2008/0277057 | A1 | 11/2008 | Montgomery et al. | | | |
| 2008/0282863 | A1 | 11/2008 | McCowin | | | |
| 2008/0302483 | A1 | 12/2008 | Vaniglia | | | |
| 2009/0025875 | A1 | 1/2009 | Hagman | | | |
| 2009/0076638 | A1 | 3/2009 | Hu et al. | | | |
| 2009/0078361 | A1 | 3/2009 | Kisch et al. | | | |
| 2009/0079998 | A1 | 3/2009 | Anderson et al. | | | |
| 2009/0166467 | A1 | 7/2009 | Hagman et al. | | | |
| 2009/0205767 | A1 | 8/2009 | Lauder et al. | | | |
| 2009/0211698 | A1 | 8/2009 | Mccowin | | | |
| 2010/0006205 | A1 | 1/2010 | McCowin et al. | | | |
| 2010/0193103 | A1 | 8/2010 | McCowin | | | |
| 2010/0224716 | A1 | 9/2010 | McCowin | | | |
| 2010/0230043 | A1 | 9/2010 | Kisch | | | |
| 2011/0277941 | A1 | 11/2011 | Hagman | | | |

FOREIGN PATENT DOCUMENTS

| | | |
|---|---|---|
| DE | 20120792 | 5/2003 |
| DE | 10342658 A1 | 4/2005 |
| EP | 1775108 | 4/2007 |
| EP | 1804146 | 7/2007 |
| EP | 1859917 A1 | 11/2007 |
| EP | 1977882 | 10/2008 |
| EP | 1992473 | 11/2008 |
| EP | 2077246 | 7/2009 |

OTHER PUBLICATIONS

USPTO Notice of Allowance for U.S. Appl. No. 11/968,542 dated Dec. 17, 2010.
USPTO Office Action dated Mar. 28, 2011 regarding U.S. Appl. No. 11/859,745, 24 pages.
USPTO Ex Parte Quayle Action dated Jan. 4, 2012 regarding U.S. Appl. No. 11/859,745, 9 pages.
USPTO Notice of Allowance dated Feb. 13, 2012 regarding U.S. Appl. No. 11/859,745, 9 pages.
Response to Office Action dated Nov. 19, 2010 regarding U.S. Appl. No. 11/968,542, 10 pages.
USPTO Office Action dated May 17, 2011 regarding U.S. Appl. No. 12/038,155, 11 pages.
USPTO Final Office Action dated Oct. 19, 2011 regarding U.S. Appl. No. 12/038,155, 9 pages.
USPTO Office Action dated Nov. 7, 2011 regarding U.S. Appl. No. 12/498,307, 15 pages.
USPTO Final Office Action dated Mar. 8, 2012 regarding U.S. Appl. No. 12/498,307, 14 pages.
USPTO Office Action dated May 10, 2011 regarding U.S. Appl. No. 12/363,749, 11 pages.
USPTO Final Office Action dated Feb. 21, 2012 regarding U.S. Appl. No. 12/363,749, 8 pages.
USPTO Office Action dated Jun. 22, 2011 regarding U.S. Appl. No. 12/404,265, 9 pages.
USPTO Notice of Allowance dated Nov. 10, 2011 regarding U.S. Appl. No. 12/404,265, 7 pages.
USPTO Notice of Allowance dated Feb. 17, 2012 regarding U.S. Appl. No. 12/404,265, 11 pages.
USPTO Office Action dated Apr. 12, 2010 regarding U.S. Appl. No. 12/400,600, 14 pages.
USPTO Final Office Action dated Sep. 17, 2010 regarding U.S. Appl. No. 12/400,600, 18 pages.
USPTO Notice of Allowance dated Mar. 28, 2012 regarding U.S. Appl. No. 12/400,600, 5 pages.
USPTO Notice of Allowance dated Jun. 8, 2012 regarding U.S. Appl. No. 11/859,745, 40 pages.
USPTO Supplemental Notice of Allowance dated Jun. 19, 2012 regarding U.S. Appl. No. 11/859,745, 38 pages.
USPTO Office Action dated Jun. 21, 2012 regarding U.S. Appl. No. 13/189,160, 45 pages.
Ashizawa et al., "Manufacturing Technology for Polymer Composite Structures," JTEC Panel Report on Advanced Manufacturing Technology for Polymer Composite Structures in Japan, Apr. 1994, 20 pages.
Cincinnati Milacron, "Into the Future With Better Ways to Automate the Manufacture of Composite Parts," Cincinnati Milacron Publication No. SP-152-3, 1998, 22 pages.
Collins, "Measuring Small," Computer Technology Review, vol. XXV No. 3, 2005, 5 pages.

European Search Report dated Sep. 15, 2008, regarding Application No. EP08008877 (EP1992473), 3 pages.
European Search Report dated Nov. 30, 2010, regarding Application No. EP08173139 (EP2077246), 2 pages.
European Search Report dated Jun. 7, 2010, regarding Application No. EP10250405 (EP2228333), 2 pages.
European Search Report dated Jun. 23, 2010, regarding Application No. EP10250484 (EP2228200), 3 pages.
Evans et al., "Fiber Placement Process Study," SAMPE 34th Symposium Book of Proceedings, Reno, NV, May 8-11, 1989, pp. 1822-1833.
Guillermin, "Advanced Composite Engineering using MSC.Pantran and FiberSIM." Composite Design Technologies, Jul. 20, 2004, 15 pages.
International Search Report dated Apr. 1, 2005, regarding Application No. PCT/US2004/015144 (WO2005030458), 2 pages.
International Search Report dated Aug. 30, 2006, regarding Application No. PCT/US2006/010704 (WO2006118692), 3 pages.
International Search Report dated Dec. 3, 2008, regarding Application No. PCT/US2008/072450 (WO2009038895), 3 pages.
International Search Report dated Mar. 2, 2009, regarding Application No. PCT/US2008/074612 (WO2009038943), 4 pages.
International Search Report dated May 28, 2009 regarding Application No. PCT/US2009/034048 (WO2009108517), 2 pages.
International Search Report dated Feb. 5, 2010, regarding Application No. PCT/US2009/049850 (WO2010005996), 2 pages.
Koschmieder et al., "On-Line Tow Width Measurement in Filament Winding," Proceedings of the 45th International SAMPE Symposium and Exhibition, Long Beach, CA, May 21-25, 2000, pp. 1417-1426.
Morrison et al., "Automatic Controlled Apparatus for Producing Tobacco Smoke Filter Rods," USPTO Defensive Publication No. T941,011, Dec. 2, 1975, 3 pages.
Olsen et al., "Automated Composite Tape Lay-up Using Robotic Devices," Proceedings of the International Conference on Robotics and Automation, Atlanta, GA, May 1993, pp. 291-297.
USPTO Office Action dated Jan. 11, 2005 regarding U.S. Appl. No. 10/437,067, 10 pages. (05165.1160).
USPTO Final Office Action dated Jul. 1, 2005 regarding U.S. Appl. No. 101437,067, 9 pages. (05165.1160).
USPTO Office Action dated Feb. 17, 2006 regarding U.S. Appl. No. 10/437,067, 10 pages. (05165.1160).
USPTO Notice of Allowance dated Sep. 13, 2006 regarding U.S. Appl. No. 10/437,067, 7 pages. (05165.1160).
USPTO Supplemental Notice of Allowance dated Dec. 27, 2006 regarding U.S. Appl. No. 10/437,067, 4 pages. (05165.1160).
USPTO Office Action dated Feb. 6, 2008 regarding U.S. Appl. No. 11/116,222, 13 pages.
USPTO Final Office Action dated Sep. 5, 2008 regarding U.S. Appl. No. 11/116,222, 12 pages.
USPTO Notice of Allowance dated Mar. 27, 2009 regarding U.S. Appl. No. 11/116,222, 4 pages.
USPTO Office Action dated Jun. 6, 2009 regarding U.S. Appl. No. 11/116,222, 11 pages.
USPTO Office Action dated Nov. 24, 2009 regarding U.S. Appl. No. 11/116,222, 9 pages.
USPTO Notice of Allowance dated Mar. 25, 2010 regarding U.S. Appl. No. 11/116,222, 5 pages.
USPTO Office Action dated Feb. 1, 2010 regarding U.S. Appl. No. 12/423,472, 36 pages.
USPTO Office Action dated Jul. 8, 2010 regarding U.S. Appl. No. 12/423,472, 25 pages.
USPTO Notice of Allowance dated Sep. 17, 2010 regarding U.S. Appl. No. 12/423,472, 6 pages.
USPTO Office Action dated Mar. 5, 2008 regarding U.S. Appl. No. 11/196,455, 12 pages.
USPTO Final Office Action dated Jul. 17, 2008 regarding U.S. Appl. No. 11/196,455, 11 pages.
USPTO Office Action dated Jan. 28, 2009 regarding U.S. Appl. No. 11/196,455, 10 pages.
USPTO Final Office Action dated Jul. 9, 2009 regarding U.S. Appl. No. 11/196,455, 8 pages.
USPTO Notice of Allowance dated Nov. 4, 2009 regarding U.S. Appl. No. 11/196,455, 8 pages.
USPTO Office Action dated Aug. 13, 2009 regarding U.S. Appl. No. 11/750,154, 9 pages.
USPTO Office Action dated Dec. 28, 2009 regarding U.S. Appl. No. 11/750,154, 7 pages.
USPTO Office Action dated May 25, 2010 regarding U.S. Appl. No. 11/750,154, 7 pages.
USPTO Final Office Action dated Sep. 14, 2010 regarding U.S. Appl. No. 11/750,154, 5 pages.
USPTO Office Action dated Aug. 21, 2009 regarding U.S. Appl. No. 11/856,372, 21 pages.
USPTO Final Office Action dated Jan. 27, 2010 regarding U.S. Appl. No. 11/856,372, 16 pages.
USPTO Notice of Allowance dated Apr. 30, 2010 regarding U.S. Appl. No. 11/856,372, 4 pages.
USPTO Supplemental Notice of Allowance dated Jul. 21, 2010 regarding U.S. Appl. No. 11/856,372, 2 pages.
USPTO Office Action dated Sep. 15, 2010 regarding U.S. Appl. No. 11/829,525, 11 pages.
USPTO Final Office Action dated Feb. 2, 2011 regarding U.S. Appl. No. 11/829,525, 12 pages.
USPTO Notice of Allowance dated Jun. 21, 2011 regarding U.S. Appl. No. 11/829,525, 12 pages.
USPTO Office Action dated Mar. 31, 2010 regarding U.S. Appl. No. 11/859,745, 18 pages.
USPTO Final Office Action dated Oct. 14, 2010 regarding U.S. Appl. No. 11/859,745, 22 pages.

* cited by examiner

GRAPHITE TAPE SUPPLY AND BACKING PAPER TAKE-UP APPARATUS

This application is a divisional application of, and claims priority to, U.S. application Ser. No. 11/968,542, filed on Jan. 2, 2008.

BACKGROUND

This disclosure generally relates to tools used in the manufacture of composite structures, and in particular, to a graphite composite tape supply and backing paper take-up apparatus for use in conjunction with a high speed, composite tape laminating machine that enables the use of larger tape supply reels and substantially wider tapes, thereby achieving higher lamination rates and lower material costs in the lamination process.

The demand for large, complex composite parts, such as are used, for example, in composite air frames, is growing rapidly. These parts are typically produced by laying parallel strips of a composite tape, e.g., unidirectional graphite fiber tape impregnated with an uncured resin (a "prepreg"), immediately adjacent to each other on a forming tool, then curing the resin. The growing demand is typically being satisfied by suppliers in one of two ways: 1) by purchasing multiple, current-technology laminating machines, or 2) by developing machines that can laminate parts at a higher rate. The second option, developing high speed laminating machines, can, in the long run, actually reduce tooling, facility, and equipment costs.

Existing tape supply solutions all rely on a relatively narrow tape that is "level wound" onto long spools, i.e., in the same manner as a line is wound onto a fishing reel equipped with a reciprocating pawl. In order to level-wind the material, the tape width is limited to 0.5 inch. The narrow tapes cannot be "single-wound," i.e., in the manner of a movie film, onto reels of a corresponding width because the diameter of the reels would have to be increased substantially to accommodate a useful amount of tape thereon, and hence, would have an unacceptably high inertia.

A "dancer," i.e., a secondary roller disposed adjacent to the spool and over which the tape unspools, is commonly used to absorb the shock applied to the tape by accelerating the spool, and a brake acting on the spool is used absorb the inertia of the spool when decelerating the spool. The existing solutions use active control of the braking force applied to the supply spool, and passive control of dancer movement. Because the existing solutions do not actively control the dancer position, they have great difficulty controlling large supply reels with varying inertias.

Thus, the existing solutions are limited to the use of spools that are level-wound with laminating tape that is limited to a maximum width of 0.5 inch. The total number of tape strips that a laminating machine can manage when laying a swath of tape is limited, and using a narrow tape creates a relatively small total swath width, thereby requiring a large number of passes of the laminating head of the machine over the layup tool to laminate a part having a relatively large area. Therefore, higher lamination rates could be achieved if multiple strips of wider strips of tape could be used reliably.

Accordingly, there is a need in the industry for an apparatus that enables a composite tape laminating machine to lay multiple tapes having greater widths reliably, and thereby achieve a substantially increased laminating speed.

SUMMARY

In accordance with the present disclosure, a graphite composite tape supply and backing paper take-up apparatus is provided for use in conjunction with a composite tape laminating machine that enables substantially larger tape supply reels and substantially wider tapes to be used on the machine reliably, thereby achieving higher laminating rates and lower material costs in the lamination process.

In one exemplary embodiment, an apparatus comprises a rotatably mounted supply reel, a rotatably mounted take-up reel disposed adjacent to the supply reel, a dancer roller mounted for lateral movement relative to the supply and take-up reels, a rotatable compaction roller adapted for rolling movement over a surface of a work piece, and a rotatably mounted stripping roller disposed between the dancer roller and the laminating head. A tape comprising first and second strands adhered to each other is wound onto the supply reel. The first strand has an outer end extending from the supply reel, around the dancer roller and the stripping roller and below the compaction roller. The second strand has an outer end extending from the supply reel, around the dancer roller and the stripping roller and coupled to a core of the take-up reel. A mechanism is provided that actively controls the rotation of the supply and take-up reels and the lateral movement of the dancer roller such that tension in at least the first strand is maintained substantially constant during the movement of the compaction roller over the surface of the work piece and a subsequent cutting of the first strand.

In another exemplary embodiment, a method comprises providing a rotatably mounted supply reel having a tape comprising first and second strands adhered to each other wound thereon; mounting a rotatably mounted take-up reel adjacent to the supply reel; mounting a dancer roller for lateral movement relative to the supply and take-up reels; mounting a rotatable compaction roller for rolling movement over a surface of a work piece; mounting a rotatable stripping roller between the dancer roller and the compaction roller; extending an outer end of the first strand from the supply reel, around the dancer roller and the stripping roller and below the compaction roller; extending an outer end of the second strand from the supply reel, around the dancer roller and the stripping roller and coupling it to a core of the take-up reel; rolling the compaction roller over the surface of the work piece such that a sticky side of the first strand is adhered to the work piece surface; cutting the second strand during the movement of the compaction roller; and, actively controlling the rotation of the supply and take-up reels and the lateral movement of the dancer roller such that tension in at least the first strand is maintained substantially constant during the movement of the compaction roller over the surface of the work piece and a subsequent cutting of the first strand.

A better understanding of the above and many other features and advantages of the apparatus of the present disclosure can be obtained from a consideration of the detailed description of an exemplary embodiment thereof below, particular if such consideration is made in conjunction with the appended drawings, wherein like reference numbers are used to refer to like elements in the respective figures thereof.

DETAILED DESCRIPTION

Figure 1:
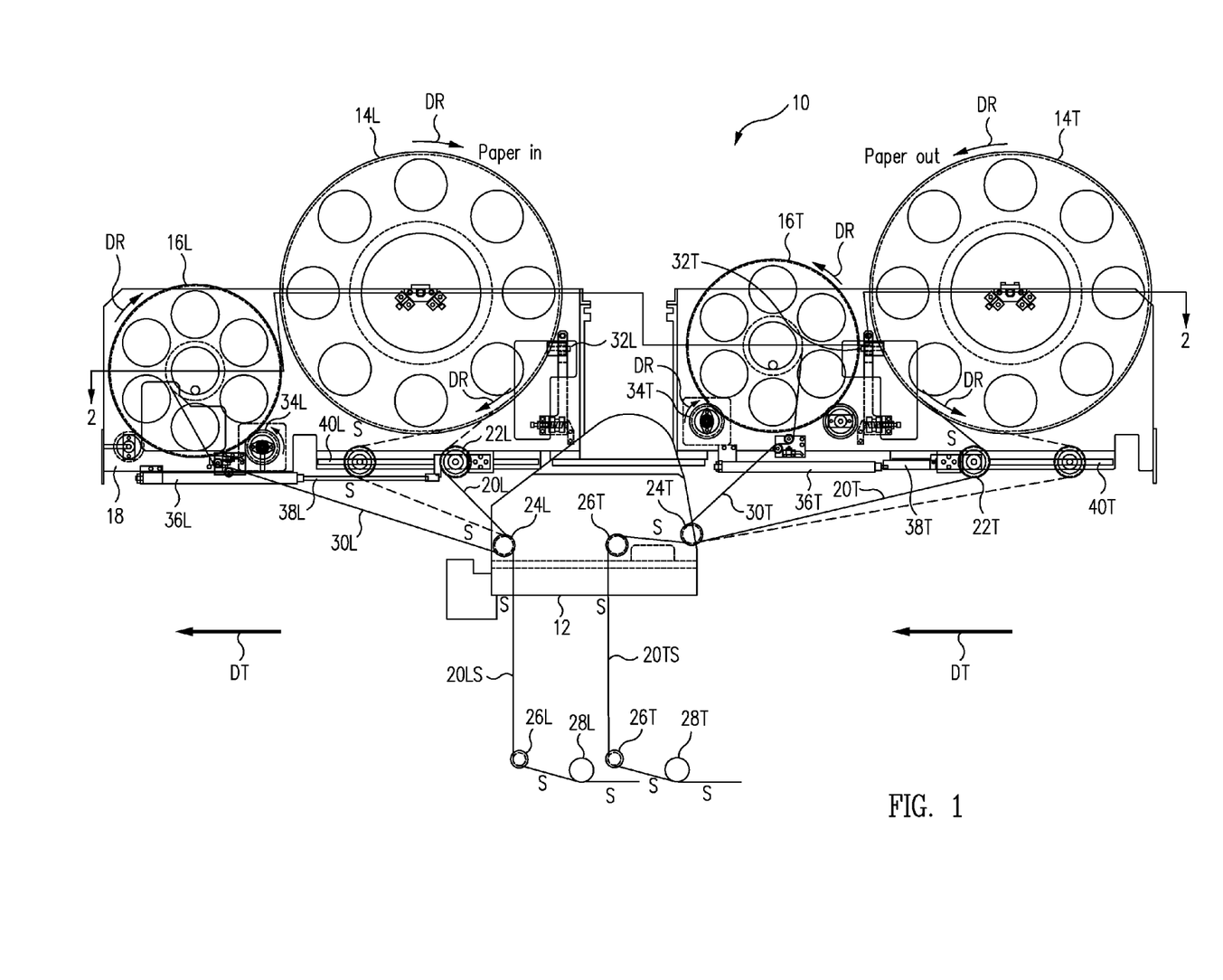
FIG. 1 is a partial elevation view of an exemplary embodiment of a graphite tape supply and backing paper take-up apparatus in accordance with the present disclosure, shown mounted on a graphite tape laminating machine and adjacent to the laminating head thereof.
Figure 2:
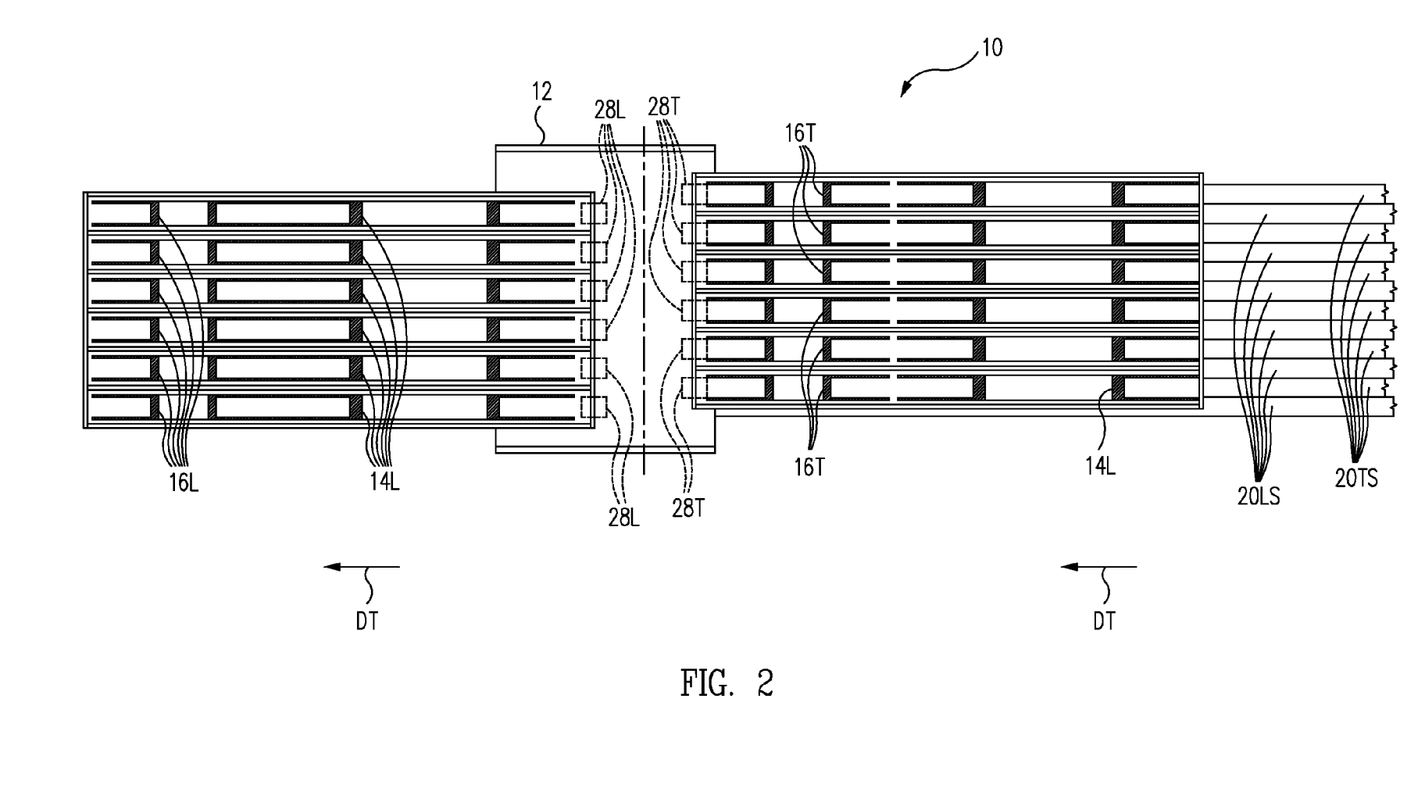
FIG. 2 is top plan cross-sectional view of the exemplary apparatus of FIG. 1, as seen along a section line extending through the respective centers of leading and trailing tape supply and backing paper take-up reels of the apparatus.
Figure 3:
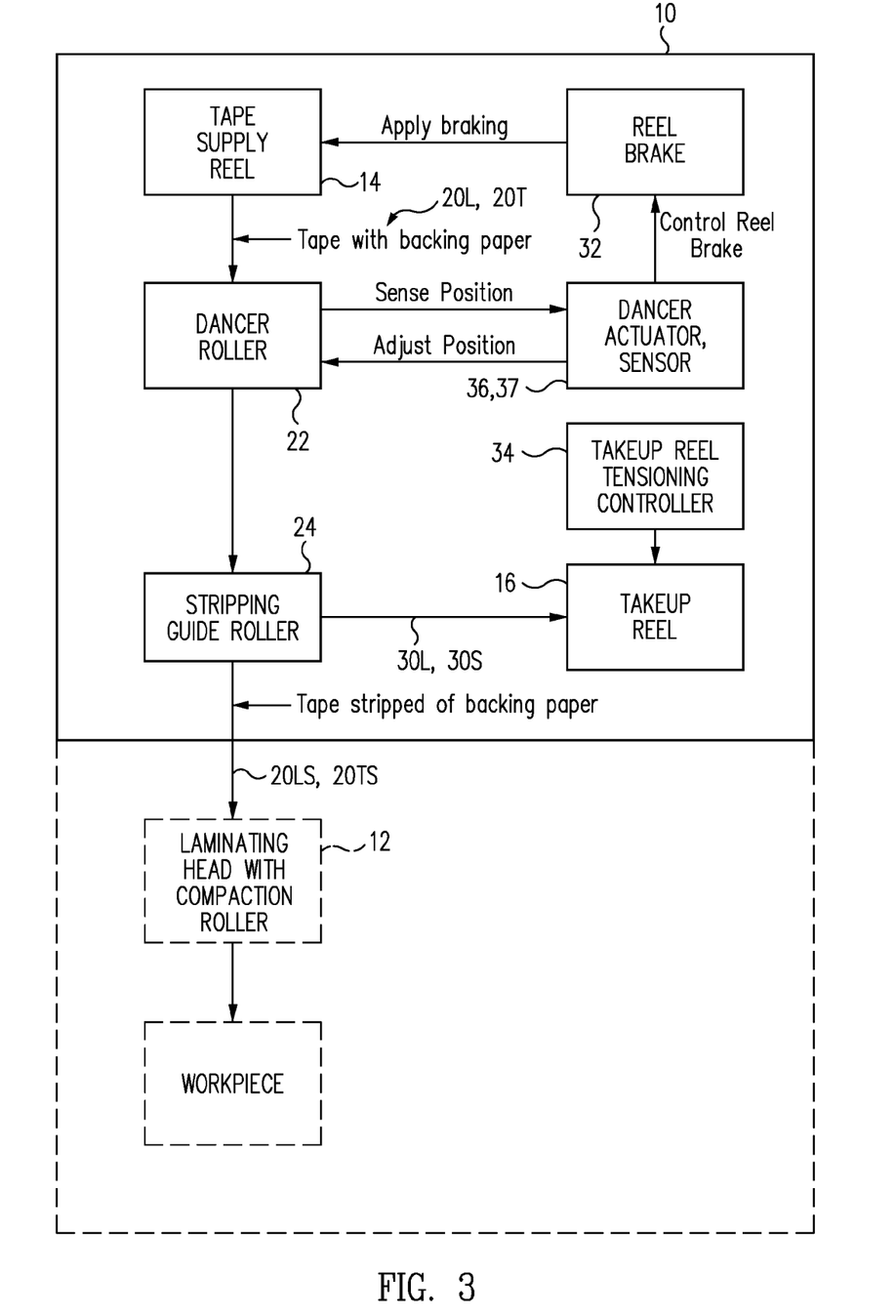
FIG. 3 is a functional block diagram of an exemplary tape supply and backing paper take-up portion of the exemplary apparatus of FIG. 1.

An exemplary embodiment of a graphite tape supply and backing paper take-up apparatus 10 in accordance with the present disclosure is illustrated in the partial elevation view of FIG. 1. FIG. 2 is a cross-sectional view of the exemplary apparatus 10, as seen along the lines of the section 2-2 taken in FIG. 1. FIG. 3 is a functional block diagram of an exemplary tape supply and backing paper take-up portion of the apparatus of FIGS. 1 and 2.

As may be seen by reference to FIGS. 1-3, the exemplary apparatus 10 comprises a pair of graphite tape supply reels 14L and 14T and an associated pair of backing paper take-up reels 16L and 16T, which may be mounted on a support frame 18 of the laminating machine for independent rotation in the direction of the arrows DR respectively associated with each reel 14L, 14T, 16L and 16T during the tape laminating process.

During the laminating process, the laminating machine (not illustrated), including the tape laminating head 12 thereof, may move in the direction of the arrows DT in FIG. 1, i.e., to the left of the figure, relative to a work piece (not illustrated) located below the laminating head 12. During this movement, strands, or "tows," of graphite tape 20L and 20T having backing papers 30L and 30T respectively adhered to them are pulled off the respective supply reels 14L and 14T, pass over respective "dancer" rollers 22L and 22T, then over respective "stripping" rollers 24L and 26T. When the respective strands 20L and 20T pass over the stripping rollers 24L and 24T, the respective backing papers 30L and 30T are stripped off the respective strands 20L and 20T and are respectively wound onto the take-up reels 16L and 16T. The strands 20LS and 20TS, i.e., the graphite tapes stripped of their respective backing papers 30L and 30T, then pass over respective guide rollers 26L and 26T, and thence, below respective compaction rollers 28L and 28T in the laminating head 12. The compaction rollers 28L and 28T of the laminating head 12 respectively press a sticky side S of a respective one of the strands of tape down onto the surface of the work piece as the laminating head 12 of the machine passes over it in the direction of the arrows DT.

At the end of the pass of the laminating head 12 over the work piece, the respective strands of tape 20LS and 20TS may be cut "on-the-fly," i.e., while the laminating machine is still moving. After the cutting operation, the laminating machine may be raised up relative to the work piece, rotated horizontally through a selected angle, e.g., 45°, 90°, 135°, 180°, to name a few, and lowered back down to the work piece. A next pass may then be made by the machine over the work piece in another direction, for example, in the opposite direction to the first pass, i.e., to the right in FIG. 1.

In the foregoing arrangement, the supply and backing paper take-up reels 14L and 16L and other associated components located to the left of the laminating head 12 in the figure always "lead" the laminating head 12 when laying tape, and hence, are referred to herein as "leading" components of the apparatus 10, whereas, the components to the right of the laminating head 12 always "trail" the head, and are therefore referred to as the "trailing" components of the apparatus.

Additionally, as illustrated in the top plan cross-sectional view of FIG. 2, in the embodiment illustrated, the trailing components 14T, 16T, 20T, 22T, 24T, 26T and 28T of the apparatus 10 may be offset transversely to the direction of movement DT of the laminating machine relative to the leading components of the apparatus at a pitch equal to the width of a corresponding one of the tapes 20L and 20T. This results in the strands of graphite tape 20LS and 20TS being laid onto the work piece simultaneously in a parallel, side-by-side, abutting relationship. Thus, the laminating machine may lay multiple strands of tape 20LS and 20TS onto the work piece simultaneously in a single pass, or swath. Further, as illustrated in FIG. 2, the laminating machine may comprise additional sets of both leading and trailing tape supply and backing paper take up components 14L, 16L, 22L, 24L, 26L and 28L and 14T, 16T, 22T, 24T, 26T and 28T that extend transversely at similar intervals, or pitches. For example, in the particular exemplary embodiment illustrated, the apparatus 10 may comprise five such additional sets 14L, 16L, 22L, 24L, 26L and 28L and 14T, 16T, 22T, 24T, 26T and 28T, such that the laminating machine is capable of laying 12 parallel, abutting strips, or swaths, of tape 20LS and 20TS onto the work piece simultaneously in a single pass of the machine over the work piece.

The graphite tape 20 employed with the laminating machine may comprise a matrix of unidirectional graphite fibers embedded within, or impregnated with, an uncured resin, of a type sometimes referred to a "prepreg." Since the resin is not cured, it is tacky, or sticky to the touch. To keep it tacky, and for ease of handling, the tape is manufactured with a liner of the backing paper 30 adhered to one side thereof. The backing paper 30 incorporates a release agent on its opposite surfaces that is different in strength, i.e., the releasing ability is stronger on one side of the backing paper than on the other. This difference in strength of adhesion with the graphite tape 20 is provided so that the tape can be single-wound onto a supply reel. The tape may then be stripped off the reel easily, i.e., without adhering to the next inward layer of tape, but with the backing paper still adhering to one side of the graphite tape, referred to herein as the "sticky" side of the tape. The backing paper may remain adhered until just prior to the application of the tape to the work piece to maximize the adhesive properties of the sticky side of the tape.

Accordingly, it is necessary to remove and store the backing paper 30 prior to the application of the tape 20 to the work piece. To store the backing paper after its removal, each supply reel 14L and 14T of the apparatus 10 is provided with an associated backing paper take-up reel 16L and 16T, respectively, disposed adjacent thereto. As illustrated in FIG. 1 and the process flow diagram of FIG. 4, at S1, the supply reels 14L and 14T are respectively loaded with graphite tapes 20L and 20T, each having respective, protective backing papers 30L and 30T adhering thereto, and the loaded supply reels 14L and 14T, along with the respective backing paper take-up reels 16L and 16T, are mounted on the laminating machine.

Figure 4:
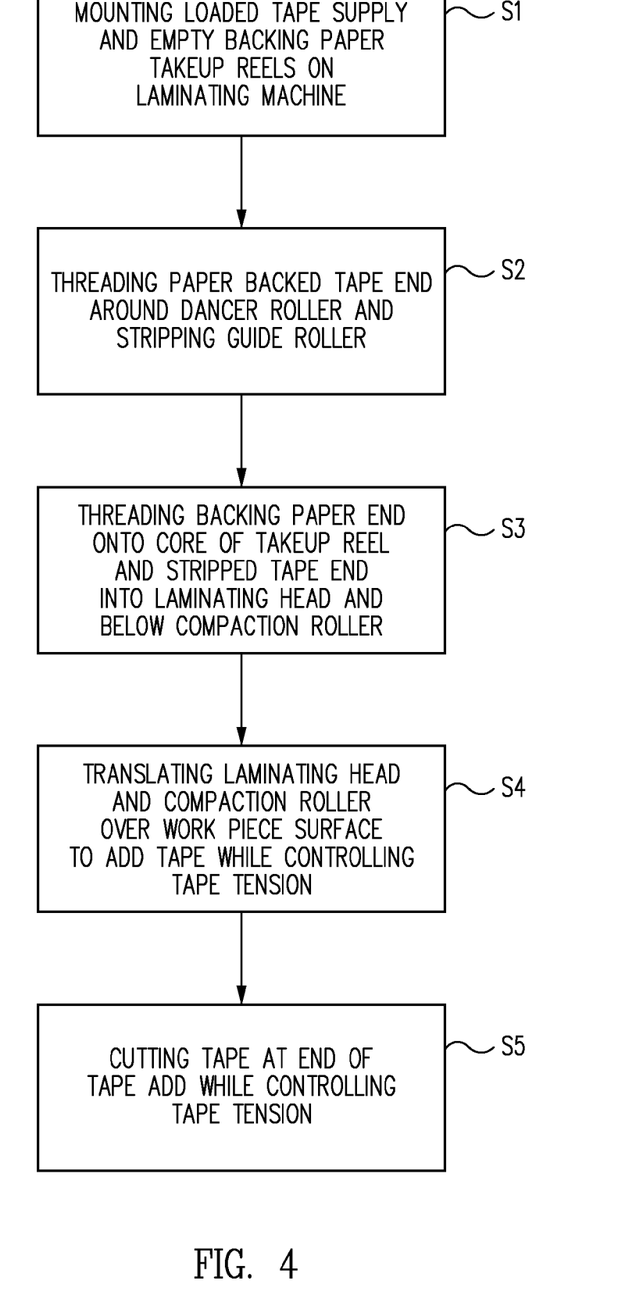
FIG. 4 is a process flow diagram showing successive steps in an exemplary embodiment of a method for supplying graphite tape to a tape laminating machine during a laminating process in accordance with the present disclosure.

At S2, the respective outer ends of the tapes 20L and 20T are threaded around the respective dancer rollers 22L and 22T, and then around the respective stripping rollers 24L and 24T. The respective backing papers 30L and 30T are then stripped away from their respective tapes 20L and 20T at the stripping rollers 24L and 24T. At S3, the respective outer ends of the backing papers are then coupled to the cores of the respective backing paper take-up reels. The outer ends of the tapes 20LS and 20TS, i.e., the graphite tapes that have been stripped of their respective backing papers, are threaded over respective guide rollers 26L and 26T, and then below their respective compaction rollers 28L and 28T in the laminating head 12.

The stripping rollers 24L and 24T are arranged such that the movements of the respective tapes 20L and 20T and their adherent backing papers 30L and 30T over the stripping rollers 24L and 24T may cause the respective tapes and backing papers to move in different directions. In other words, the tapes and their respective backing papers are pulled apart from one another at the respective stripping rollers 24L and 24T. This change in relative movement between the tapes and their respective backing papers imparts tension forces that can act on the plane of adhesion between the tapes and their respective backing papers and thereby strip the backing papers from their respective tapes for subsequent winding onto the respective backing paper take-up reels 16L and 16T.

Thus, during a laminating operation, the tapes 20L and 20T are pulled off their respective supply reels 14L and 14T, pass over the respective dancer rollers 22L and 22T, and then over the respective stripping rollers 24L and 24T. At this point, the respective backing papers 30L and 30T are stripped from the respective tape strands and then spooled onto the backing paper take-up reels 16L and 16T of the apparatus, as illustrated in FIG. 1. The graphite tape strands 20LS and 20TS then pass respectively onto the corresponding guide and compaction rollers 26L, 26T and 28L and 28T that follow. The sticky sides of the tapes (indicated by the S's in the figures), which were formerly protected by the backing papers 30L and 30T, are now appropriately exposed and disposed for application to the work piece by the respective compaction rollers 28L and 28T.

As illustrated in the process flow diagram of FIG. 4, the laminating process includes two steps S4 and S5. These steps may involve relatively sharp accelerations and decelerations of the graphite tape, and hence, the associated respective tape-supply and backing-paper take-up reels 14L, 14T and 16L, 16T. These steps may be referred to as a tape "add" step S4 and a tape "cut" step S5.

In the add process S4, the laminating head 12 of the laminating machine, and in particular, the compaction rollers 28L and 28T, are translated a short distance above the work piece. Prior to an add, the end of the tapes 20LS and 20TS may be disposed a short distance from the compaction rollers 28L and 28T. The tape feed may begin just prior to lowering the head when the end of the tape may be vertically aligned with a first location on the work piece, e.g., an edge thereof, at which the beginning of a pass may take place. The compaction rollers 28L and 28T may then lowered onto the work piece such that the compaction rollers tack the sticky side of the respective ends of the tapes 20LS and 20TS to the work piece. The adds are done "on-the-fly," that is, while the laminating machine and head 12 are moving relative to the work piece. The machine, including the tape supply apparatus 10, may then translate over the work piece in the direction DT of the arrows in FIG. 1 at a high rate of speed, such that the compaction rollers press the sticky sides "S" of the multiple strands of tape 20LS and 20TS onto the work piece, causing the tape strands to adhere to it. During the add step, the tapes 20L and 20T may be forcefully stripped off the respective supply reels 14L and 14T very rapidly by the movement of the machine across the work piece, i.e., may be forcefully accelerated, along with the supply reels 14L and 14T, and accordingly, the tension in the tapes may need to be accurately controlled in order to prevent the rollers of the laminating head 12 from skidding on the tapes, causing damage, or adversely impacting the accuracy of the add. Because the adds are done on-the-fly (i.e., the laminating machine does not pause over the work piece at the add locations), the timing of the add and the tension in the tapes may need to be controlled very consistently.

The end of the pass may occur when the compaction rollers 28L and 28T pass over a second location on the work piece, for example, an opposite, second edge thereof. At the end of the pass, the tape add step may terminate, and the cut process S5 may commence. During the cut process, respective knives (not illustrated) may quickly sever the tapes 20LS and 20TS on-the-fly, i.e., while the tapes are still moving, and coincident with the second location on the work piece. During the cut process, the tapes 20LS and 20TS, and hence, the respective supply reels 14L and 14T, may be decelerated very rapidly. As above, the respective tensions in the tapes 20LS and 20TS may therefore need to be carefully managed to prevent undesirable consequences.

As those of skill in the art will appreciate, it may be necessary to maintain precise, accurate control over the tension in the graphite tapes 20LS and 20TS during both add and cut processes to obtain an accurate, reliable, high speed laminating process. The exemplary apparatus 10 described herein may be adapted to provide such precise control. Also, although the apparatus may use an unprecedented 1.5 inch wide graphite tape 20 wound onto the supply reels 14L and 14T, it is not limited to those widths, but may also be used advantageously for other tape widths, as well.

The apparatus 10 of the present disclosure may thus be particularly suited for supplying the large quantities of material needed for high speed lamination. When laminating contoured parts, wide swaths of material composed of a number of narrow strips may be laid in a single pass, as discussed above. This process is referred to herein as "fiber placement." One of the difficulties with fiber placement experienced by conventional laminating apparatus may be in controlling the numerous individual tape supplies. Particularly, in maintaining the appropriate tension in the tapes during laminating so as to avoid tape bridging at sharp contours during adds, tape overruns at cuts and/or other undesirable situations. The apparatus 10 may supply consistently oriented graphite tapes 20L and 20T from respective supply reels 14L and 14T. The apparatus may remove and collect the respective backing papers 30L and 30T on respective separate take-up reels 16L and 16T. The apparatus may have actively controlled dancer rollers 22L and 22T, supply reel braking systems 32L and 32T and backing paper take-up reel tensioners 34L and 34T that may be adapted to precisely manage tape tension and reel inertia in the manner described below. The apparatus may thus provide a reliable means for supplying multiple swaths of relatively wide graphite tapes 20 to a laminating machine that employs high-speed, on-the-fly tape course adds and cuts.

The apparatus 10 may use a simple on/off active control to manage the movement of the dancers 22L and 22T and to provide an appropriate braking of the supply reels 14L and 14T that may be independent of lamination speed or reel inertia. As discussed above, the tape supply spools that are used by existing solutions may also increase material costs. In existing solutions, the graphite tape, or "slit material," is first removed from the backing paper, and a thin plastic "replacement" backing film is then re-applied to the tape prior to winding it onto the spool cores. As discussed above, the apparatus 10 of the present disclosure uses tape 20L, 20T to which the original backing paper 30 is still attached, thereby obviating the need for replacement backing films. Another disadvantage of the prior art solutions is that the multiple, level-wound spools needed for wide lamination swath widths require significantly more width than the large diameter, narrow width supply reels 14L and 14T that can be stacked side-by-side, as in the apparatus 10 illustrated in, e.g., FIGS. 1 and 2 herein.

As illustrated in FIG. 1, the apparatus 10 may be designed to accept large, single wound supply reels 14L, 14T that are wound with relatively wide tapes 20L, 20T, i.e., tapes having a width that is three times or greater than the 0.5 in. wide tapes to which the prior art tape supply apparatuses are limited. In one embodiment of the present tape supply apparatus 10, the respective dancers 22L and 22T may be mounted in respective linear guides 40L and 40T on the support frame 18. Respective pneumatic actuators 36L and 36T may supply respective forces to the dancers 22L and 22T through respective pushrods 38L and 38T. A simple on/off control may change the force applied to the respective dancers 22L and 22T from a low value to a high value. This simple, active control mechanism ensures that the respective supply reels 14L and 14T stop without creating slack in the tapes 20L and 20T during an on-the-fly cut, and that the dancers 22L and 22T may be in the optimum position for an on-the-fly add. Properly positioned dancers ensure that adds may be accomplished without causing excessively high tension in the tapes, which may result in tape damage or course start inaccuracies, and that cuts may be accomplished without tape overrun.

Thus, during steady state lamination, the pneumatic dancer actuation cylinders 36L and 36T, backing paper take-up spool tensioners 34L and 34T, and the braking forces applied to the supply reels 14L and 14T by the respective reel brakes 32L and 32T may combine to keep the tension in the tapes 20LS and 20TS at the respective compaction rollers 28L and 28T low and consistent. Excessive tension at the compaction rollers 28L and 28T can also cause bridging at step changes in the contour of the work piece forming tool (not illustrated).

The apparatus 10 may also support all-sticky-side-down lamination. As discussed above, the side "S" of the graphite tape 20 that is adhered to the backing paper 30 may exhibit significantly more tack than a side that has been exposed to air and light for any length of time. Testing of the apparatus 10 has demonstrated that laminating performance may be improved if all the tapes are facing in one direction, in other words, with the sticky side "S" facing down. As discussed above, the exemplary configuration illustrated in FIGS. 1 and 2 may enable the laminating machine to place all graphite tapes of a swath with the sticky side down. Accordingly, the leading supply reel 14L may be single wound with the backing paper 30L facing in ("paper in"), and the trailing reel 14T may be single wound with the backing paper 30T facing out ("paper out"). Instead of simply mirroring the position of the backing paper take-up reels 16L and 16T, they may instead be respectively positioned as illustrated in FIG. 1 so as to take up the backing papers 30L and 30T respectively facing in and out, as the respective tapes 20L and 20T feed toward the laminating machine.

Of importance, the apparatus 10 of this disclosure may provide the active control needed to use large, high-inertia supply reels 14L and 14T that may be single-wound with a relatively wide tape. As discussed above, the existing solutions may be limited to using level-wound spools of 0.5 inch wide tape. The apparatus 10 may thus provide an essential element of a laminating system that may exhibit lower material costs and substantially higher lamination rates.

Figure 5:
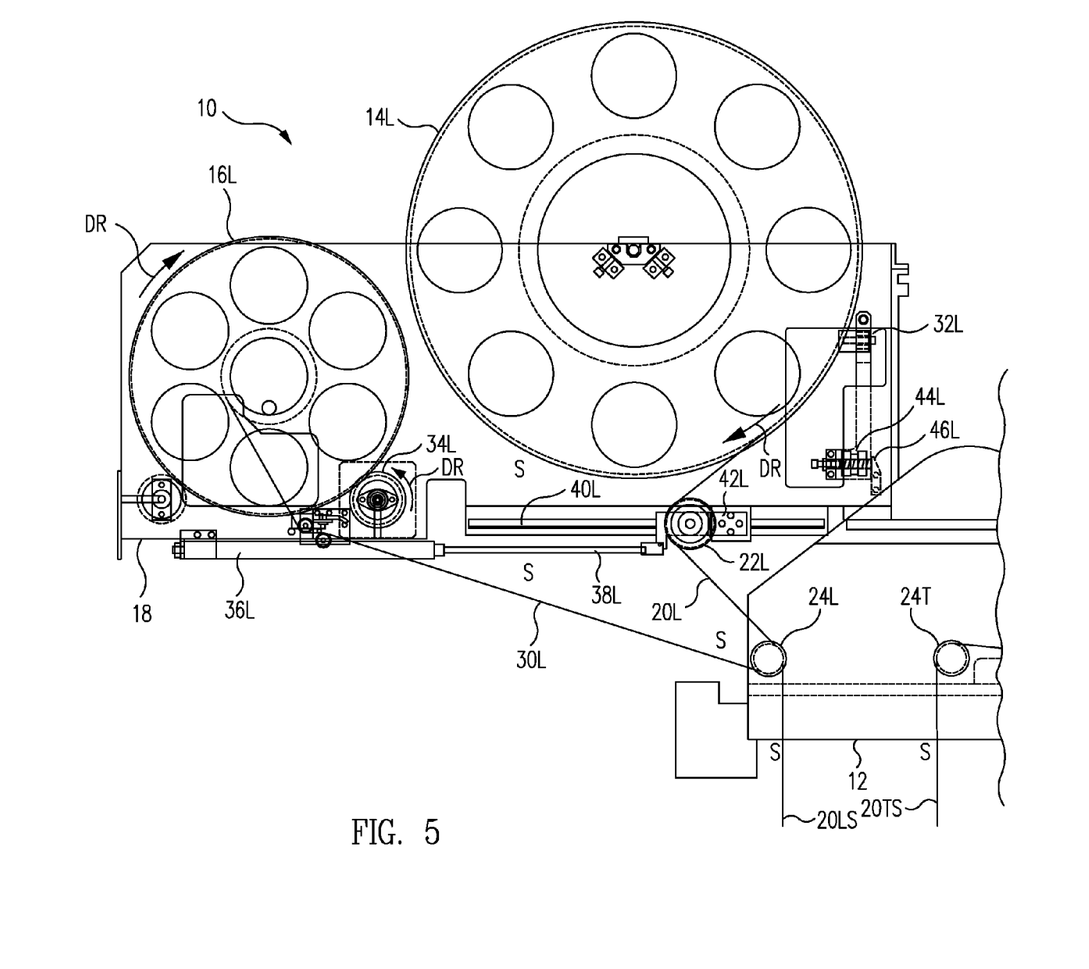
FIG. 5 is an enlarged partial elevation view of a leading supply reel and associated take up reel of the exemplary apparatus, shown during a steady state tape laminating operation.

FIG. 5 is an enlarged partial elevation view of a portion of the apparatus 10, showing only the leading supply reel 14L and associated take-up spool 16L thereof during a steady state tape laminating operation. As illustrated in FIG. 5, the tape 20L is first re-directed around the dancer roller 22L before heading into the laminating head 12 of the laminating machine. The tension in the tape 20L may produce a force on the dancer carriage 42L that is directed toward the right of the figure. The pneumatic cylinder 36L may produce a force on the carriage 42L that is directed to the left and that may only partially balance the tape tension force. During steady state lamination, a pneumatic actuating cylinder 44L coupled to a brake lever 46L so as to selectively apply a high braking force to the rim of the supply reel 14T may be deactivated, which may cause an integral compression spring of the brake lever to produce a low, substantially constant braking force on the supply reel. The braking force may create a controlled tension in the moving tape 20L. The tape tension, in turn, may hold the dancer roller 22L in a fully extended position, as illustrated in FIG. 5. As described above, as the tape 20L passes over the stripping roller 24L of the laminating machine, the backing paper 30L is peeled away from the tape 20L. The backing paper 30L may absorb some of the tension that was in the tape 20L upstream of the roller 24L, and the remaining, controlled tension in the tape 20LS extends down to the compaction roller 28L (not seen in FIG. 5).

Figure 6:
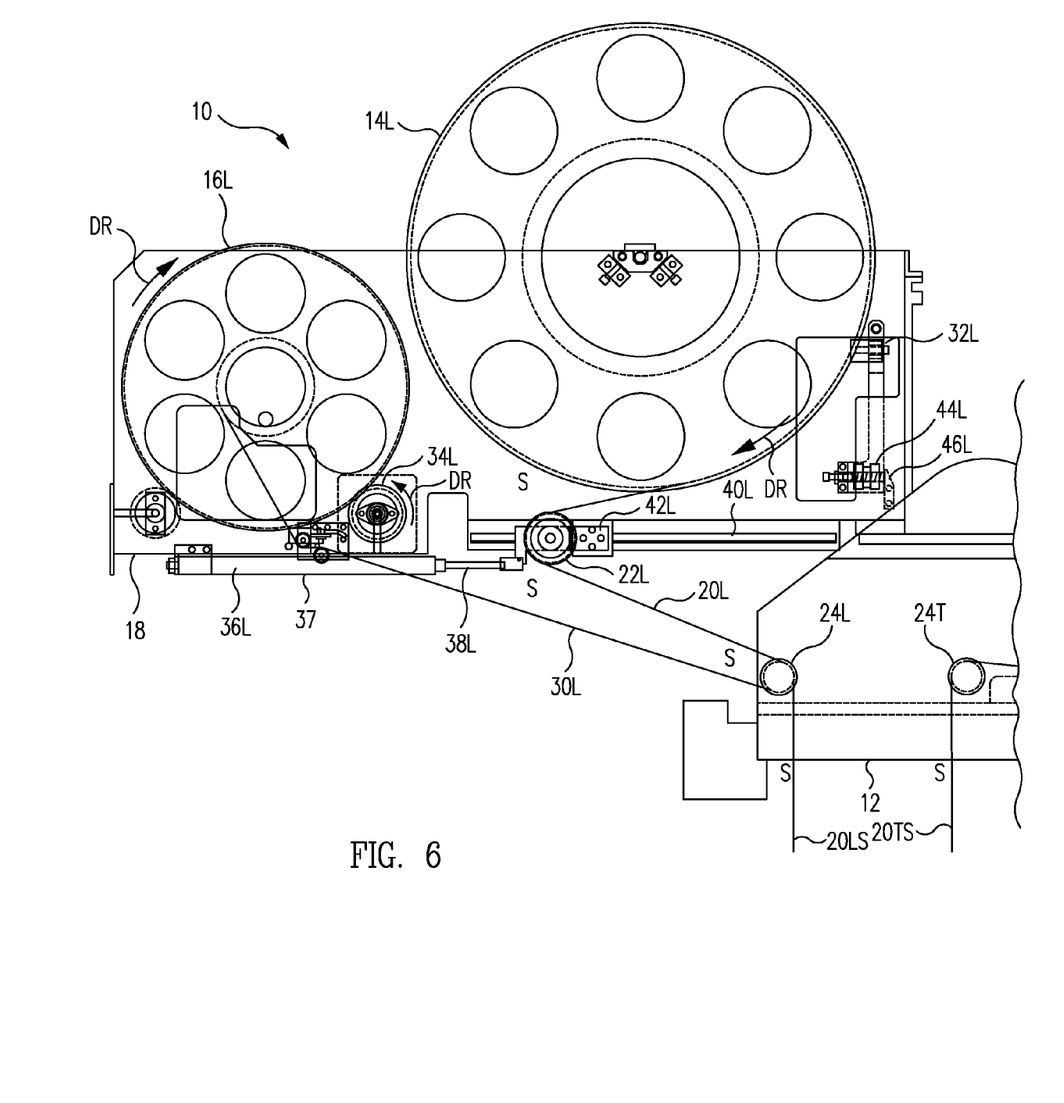
FIG. 6 is another enlarged partial elevation view of the supply and take up reels of FIG. 5, shown immediately after a "cut" operation and prior to an "add" operation.

FIG. 6 is an enlarged partial elevation view of the leading supply and backing paper take-up reels 14L and 16L portion of the apparatus 10 of FIG. 5, shown immediately after a cut operation S5 and poised for an add operation. When the tape 20L is cut, the pneumatic dancer actuating cylinder 36L may be switched to a higher retraction force, which may cause the actuating rod 38L of the actuator to retract the dancer carriage 42L, and hence, the dancer 22L, to the left, relative to the support frame 18, as illustrated in FIG. 6. This movement of the dancer 22L may take up the slack in the tape 20L as the supply reel 14L decelerates due to the constant drag force acting thereon by the reel brake 32L described above. Once the cylinder 36L has retracted the dancer 22L by about 80% of its total travel, a signal generated by a sensor 37 located in the pneumatic actuator 36L and adapted to sense the position of the dancer 22L relative to the actuator 36L may be used to actuate the high-force pneumatic braking cylinder 44L described above, which quickly stops the supply reel 14L from rotating.

Figure 7:
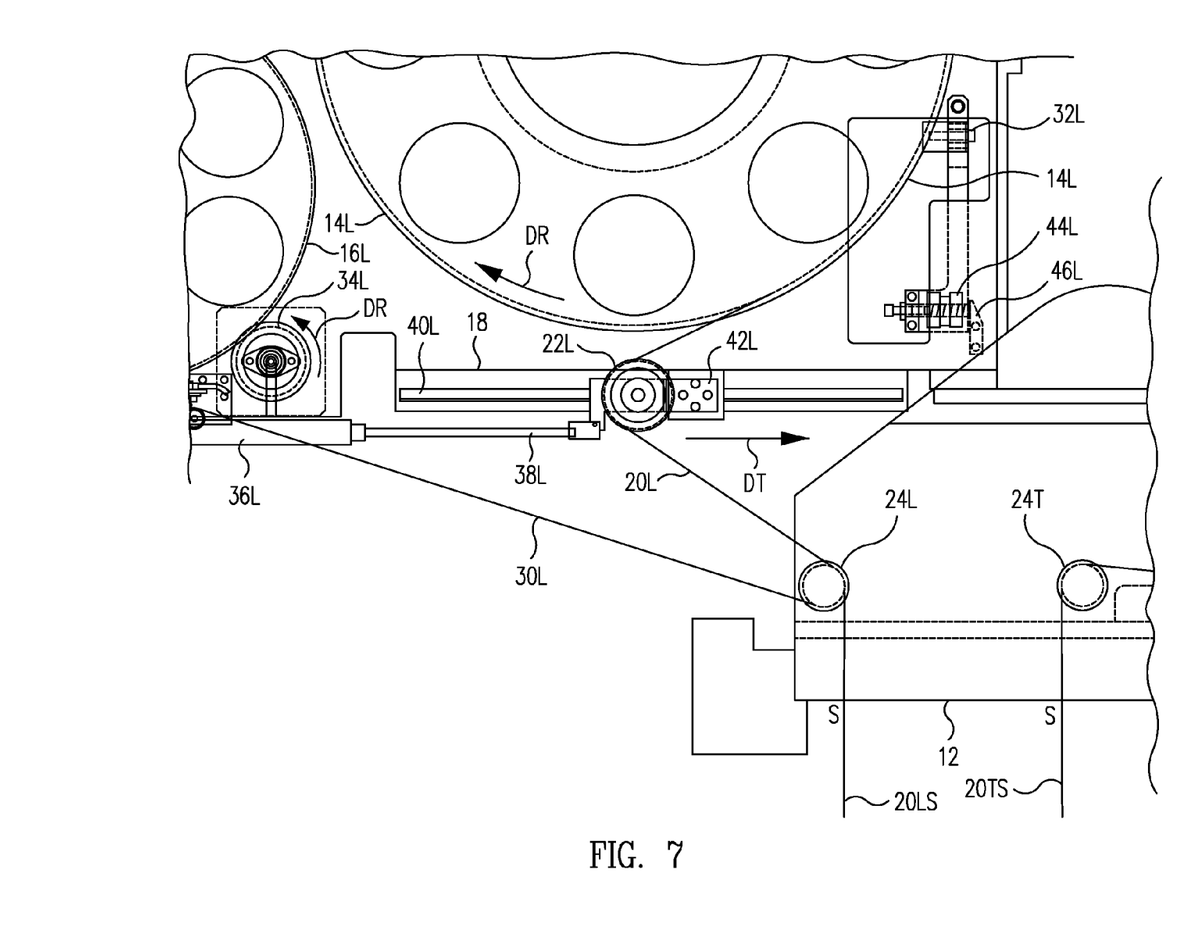
FIG. 7 is another enlarged partial elevation view of the leading supply and take up reels, shown during an add operation.

FIG. 7 is an enlarged partial elevation view of the leading supply and backing paper take-up reels 14L and 16L portion of the apparatus 10 of FIG. 5, shown during an add operation. At the beginning of the add, the force provided by the pneumatic actuation cylinder 36L on the dancer 22L may be reduced to the low setting. The tension in the tape 20L may then move the dancer 22L to the right, as indicated by the large arrow DT in FIG. 7. Providing a minimum tension in the tape 20L during an add may improve the accuracy and consistency of the starting point.

Figure 8A:
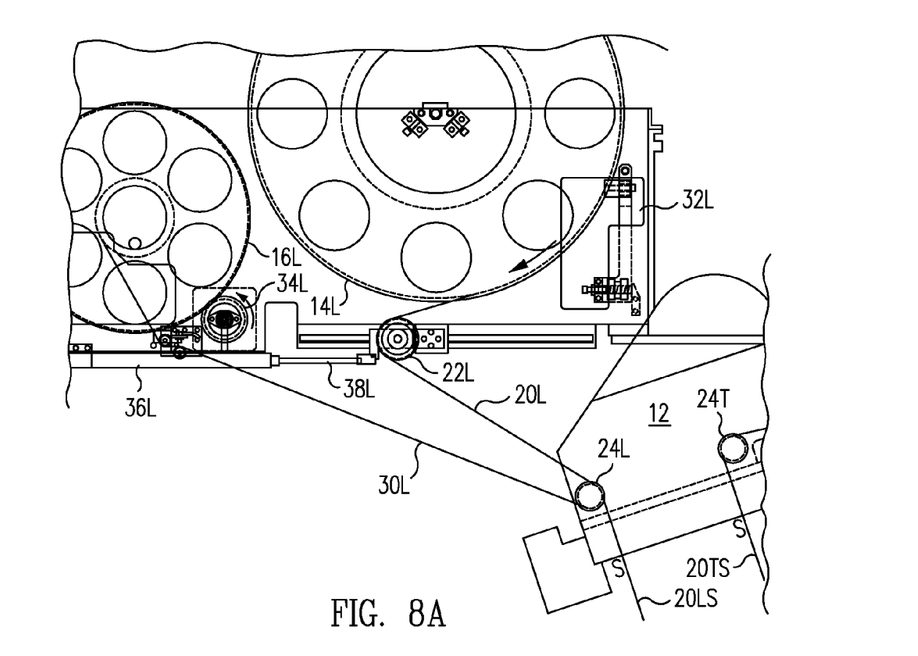
FIGS. 8A and 8B are enlarged partial elevation views of the leading supply and take-up reels of FIG. 5, showing movement of a dancer of the apparatus after a cut operation.
Figure 8B:
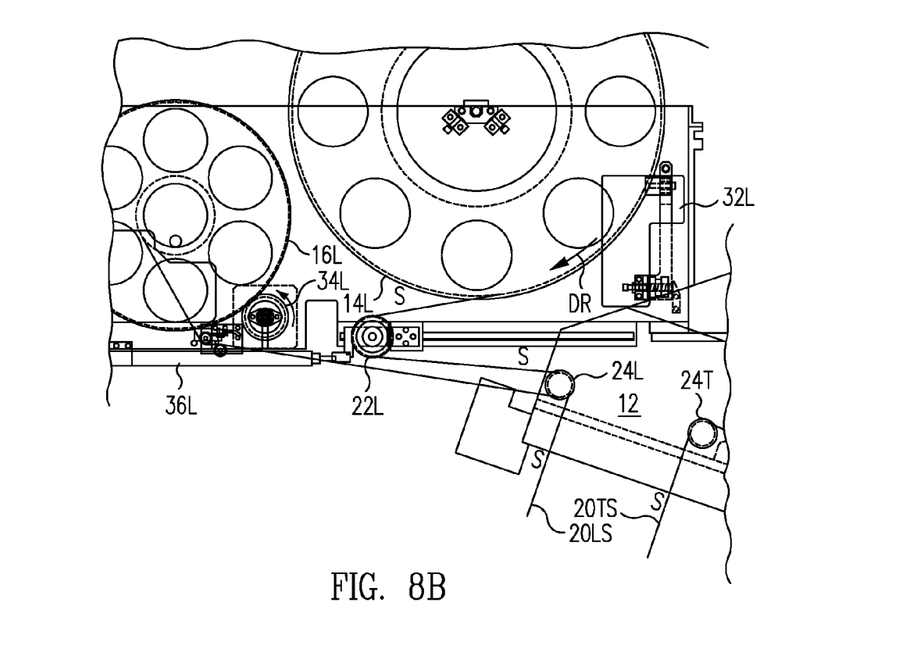

FIGS. 8A and 8B are enlarged partial elevation views of the leading supply and backing paper take-up reels 14L and 16L portion of the apparatus 10 of FIG. 5 after a cut operation S5, at which the supply reel 24L may be braked against rotation. While laminating material on a work piece and during repositioning moves, the head 12 of the laminating machine may rock down, as shown in FIG. 8A, or up, as shown in FIG. 8B. After a cut S5, the reel brake 32L prevents rotation of the supply reel 14L. Since the rocking movement of the head 12 illustrated in the figures may change the length of tape between the supply reel 14L and the head 12, the dancer 22L may move appropriately to maintain constant tape tension constant during the rocking movement of the laminating head 12. Thus, as respectively illustrated in FIGS. 5A and 5B, rotation of the head 12 during lamination may affect the pay-out velocity of the tape 20L. Rotation of the head 12 when the supply reel 14L is stationary may cause the dancer 22L to move. Accordingly, the dancer 22L may not be retracted fully during the cut so that it may take up any slack in the tape immediately after the cut.

In accordance with the exemplary embodiments described herein, the apparatus 10 may provide an important feature of a high-speed tape laminating machine. Current spool-based machines using level wound tape with widths of 0.5 inches cannot achieve lamination rates as high as machines equipped with large supply reels single-wound with wider tapes. Accordingly, the apparatus 10 may help move tape lamination technology to a higher level that reduces the costs of tooling, facilities, materials and equipment.

Figure 9:
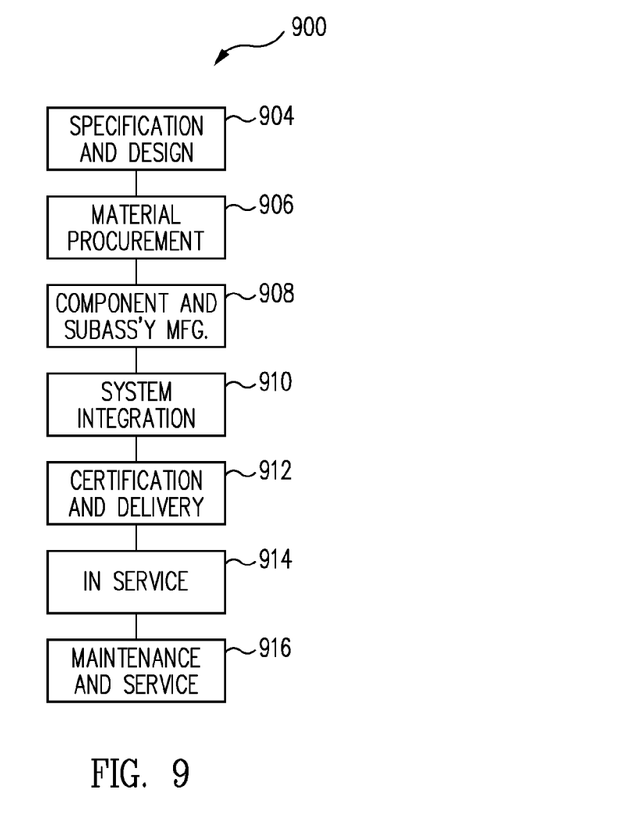
FIG. 9 is a flow diagram of aircraft production and service methodology.
Figure 10:
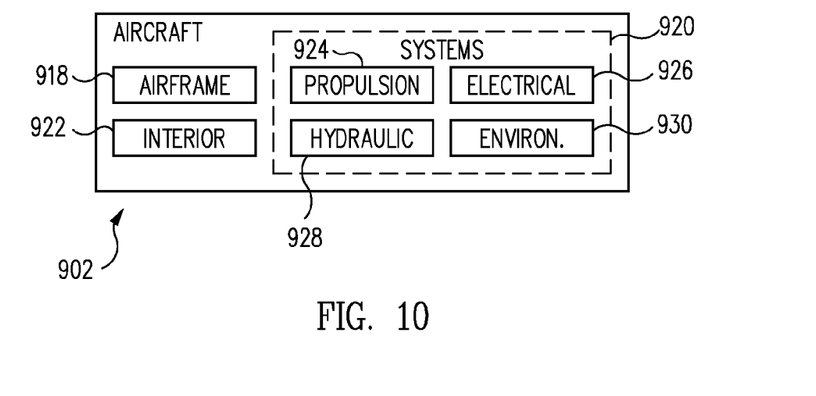
FIG. 10 is a block diagram of an aircraft.

Referring more particularly to the drawings, embodiments of the disclosure may be described in the context of an aircraft manufacturing and service method 900 as shown in FIG. 9 and an aircraft 902 as shown in FIG. 10. During pre-production, exemplary method 900 may include specification and design 904 of the aircraft 902 and material procurement 906. During production, component and subassembly manufacturing 908 and system integration 910 of the aircraft 902 takes place. Thereafter, the aircraft 902 may go through certification and delivery 912 in order to be placed in service 914. While in service by a customer, the aircraft 902 is scheduled for routine maintenance and service 916 (which may also include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 902 produced by exemplary method 900 may include an airframe 918 with a plurality of systems 920 and an interior 922. Examples of high-level systems 920 include one or more of a propulsion system 924, an electrical system 926, a hydraulic system 928, and an environmental system 930. Any number of other systems may be included. Although an aerospace example is shown, the principles of the invention may be applied to other industries, such as the automotive industry.

Apparatus and methods embodied herein may be employed during any one or more of the stages of the production and service method 900. For example, components or subassemblies corresponding to production process 908 may be fabricated or manufactured in a manner similar to components or subassemblies produced while the aircraft 902 is in service. Also, one or more apparatus embodiments, method embodiments, or a combination thereof may be utilized during the production stages 908 and 910, for example, by substantially expediting assembly of or reducing the cost of an aircraft 902. Similarly, one or more of apparatus embodiments, method embodiments, or a combination thereof may be utilized while the aircraft 902 is in service, for example and without limitation, to maintenance and service 916.

As those of skill in this art will appreciate, many modifications, substitutions and variations can be made in the applications and methods of implementation of the tape supply and backing paper take up apparatus of the present disclosure without departing from its spirit and scope. In light of this, the scope of the present disclosure should not be limited to that of the particular embodiments illustrated and described herein, as they are only by way of some examples thereof, but instead, should be fully commensurate with that of the claims appended hereafter and their functional equivalents.

What is claimed is:

1. An apparatus, comprising:
   a supply reel;
   a brake operatively connected to the supply reel;
   a take-up reel operably disposed with respect to the supply reel;
   a tensioner operatively connected to the take-up reel;
   a dancer roller mounted for movement relative to the supply reel and the take-up reel, wherein the supply reel, take-up reel, and dancer roller are configured for winding a tape onto the supply reel, around the dancer roller and the take-up reel;
   an actuator operable to move the dancer roller to a selected position relative to the supply reel and the take-up reel, and to sense a current position of the dancer roller relative to the supply reel and the take-up reel; and
   a mechanism operatively connected to the brake, the tensioner, and the actuator, wherein the mechanism is configured to maintain a substantially constant tension in the tape during operation of the apparatus.

2. The apparatus of claim 1, wherein the tape is single-wound on the supply reel.

3. The apparatus of claim 1 further comprising:
   a compaction roller operatively disposed with respect to the dancer roller and configured to perform a rolling movement over a surface of a work piece, and wherein the tape is further wound around the compaction roller, and wherein the mechanism further actively controls the brake, tensioner, and actuator such that the tension is maintained substantially constant during movement of the compaction roller over the surface of the work piece and a subsequent cutting of the tape.

4. The apparatus of claim 3 further comprising:
   a laminating head operatively disposed with respect to the compaction roller, wherein the laminating head is configured to apply the tape to the surface of the work piece;
   a stripping roller disposed between the dancer roller and the laminating head;
   wherein the tape comprises first and second strands adhered to each other and wound onto the supply reel, the first strand having an outer end extending from the supply reel, around the dancer roller and the stripping roller and below the compaction roller, the second strand having an outer end extending from the supply reel, around the dancer roller and the stripping roller and coupled to a core of the take-up reel; and
   wherein the mechanism is further configured to actively control rotation of the supply and take-up reels and the movement of the dancer roller such that the tension in at least the first strand is maintained substantially constant during the movement of the compaction roller over the surface of the work piece.

5. The apparatus of claim 4, wherein the second strand is coated with a release agent on opposite sides thereof, and wherein a release property of the release agent on one side is stronger than a release property of the release agent on the other side.

6. The apparatus of claim 4, wherein the first strand comprises a matrix of graphite fibers impregnated with an uncured resin.

7. The apparatus of claim 4, wherein the apparatus supplies the first strand to the laminating head with an adhering side thereof facing toward the work piece.

8. The apparatus of claim 4, further comprising a first strand tension control mechanism comprising:
   a sensor configured to sense the current position of the dancer roller and to generate a signal corresponding to the current position;
   an actuator coupled to the dancer roller and operative to move the dancer roller laterally in response to the signal generated by the sensor; and
   wherein the brake is configured to act on the supply reel to brake rotation of the supply reel in response to the signal generated by the sensor, and wherein the tensioner is configured to act on the take-up reel and to maintain tension in the second strand substantially constant.

9. The apparatus of claim 8, wherein the sensor comprises a proximity sensor located in the actuator.

10. The apparatus of claim 8, wherein the actuator comprises a pneumatic actuator.

11. A tape laminating machine for aircraft fabrication equipped with the apparatus of claim 1.

12. An apparatus for supplying graphite tape to a laminating machine wherein the laminating machine is a high speed graphite tape laminating machine, the apparatus comprising:
   a tape supply reel rotatably mounted on a support frame of the laminating machine;
   a brake operatively connected to the supply reel;
   a backing paper take-up reel rotatably mounted on the support frame adjacent to the tape supply reel;
   a tensioner operatively connected to the backing paper take-up reel;
   a dancer roller mounted for lateral movement on the support frame;
   a stripping roller rotatably mounted between the dancer roller and a laminating head;
   a strand of graphite tape level-wound onto the supply reel, the tape having a paper backing adhering to a sticky side thereof and an outer end extending from the supply reel, around the dancer roller and the stripping roller and to a laminating head of the laminating machine,
   the paper backing having an outer end extending from the supply reel, around the dancer roller and the stripping roller and connected to a core of the take-up reel, and
   wherein the stripping roller is arranged such that movement of the tape and backing paper over the stripping roller causes the tape and backing paper to move in different directions, thereby imparting a tension force on a plane of adhesion between the tape and backing paper and stripping the backing paper from the tape for winding onto the take-up reel;
   an actuator operable to move the dancer roller to a selected position relative to the supply reel and the backing paper take-up reel, and to sense a current position of the dancer roller relative to the supply reel and the backing paper take-up reel; and
   a mechanism for actively controlling the brake to control the rotation of the tape supply reel and backing paper take-up reel, the tensioner, and the actuator to control the lateral movement of the dancer roller relative to the support frame such that tension in the tape is maintained substantially constant during both a tape add operation and a tape cut operation of the laminating machine.

13. The apparatus of claim 12, wherein the apparatus is disposed on the support frame so as to lead the laminating head during movement of the laminating head across a surface of a work piece, and further comprising:
   a second apparatus disposed adjacent to the apparatus so as to trail a compaction roller of the apparatus during movement of the compaction roller across the surface of the work piece and being offset transversely from the apparatus by a width of a first strand of the tape.

14. The apparatus of claim 13, further comprising a plurality of leading and lagging apparatuses respectively offset transversely from each other such that the laminating machine is capable of simultaneously laminating a plurality of parallel, transversely abutting graphite tapes onto the surface of the work piece in a single pass of the compaction rollers over the surface.

15. The apparatus of claim 12, wherein the apparatus is disposed on the support frame so as to lead a compaction roller during movement thereof across a surface of a work piece, and further comprising:
   a second apparatus disposed adjacent to the apparatus so as to trail the compaction roller during movement thereof across the surface of the work piece and being offset transversely from the apparatus by a width of a first strand of the tape.

* * * * *